(12) United States Patent
Lauer (10) Patent No.: US 10,603,753 B2
(45) Date of Patent: Mar. 31, 2020

(54) DUST EXTRACTOR

(71) Applicant: Black & Decker Inc., New Britain, CT (US)

(72) Inventor: Arthur Lauer, Frankfurt (DE)

(73) Assignee: Black & Decker, New Britain, CT (US)

( * ) Notice: Subject to any disclaimer, the term of this patent is extended or adjusted under 35 U.S.C. 154(b) by 473 days.

(21) Appl. No.: 15/240,252

(22) Filed: Aug. 18, 2016

(65) Prior Publication Data

US 2017/0057037 A1 Mar. 2, 2017

(30) Foreign Application Priority Data

Aug. 25, 2015 (GB) .................................. 1515084.0

(51) Int. Cl.
| | | |
|---|---|---|
| *B23Q 11/00* | (2006.01) | |
| *B25D 17/14* | (2006.01) | |
| *B25D 17/18* | (2006.01) | |
| *B25D 16/00* | (2006.01) | |
| *B25D 17/20* | (2006.01) | |

(52) U.S. Cl.
CPC ...... *B23Q 11/0071* (2013.01); *B23Q 11/0046* (2013.01); *B25D 16/00* (2013.01); *B25D 17/20* (2013.01); *B25D 2217/0057* (2013.01)

(58) Field of Classification Search
CPC .............. B23Q 11/006; B23Q 11/0046; B23Q 11/0071; B25F 5/02
USPC ..................................... 173/75, 77, 197, 198
See application file for complete search history.

(56) References Cited

U.S. PATENT DOCUMENTS

| | | | | |
|---|---|---|---|---|
| 4,192,390 A | * | 3/1980 | Wanner .............. | B23Q 11/0046 173/198 |
| 5,199,501 A | * | 4/1993 | Kluber ............... | B23Q 11/0046 173/171 |
| 5,467,835 A | * | 11/1995 | Obermeier ......... | B23Q 11/0046 173/75 |
| 6,851,898 B2 | * | 2/2005 | Ege .................... | B23Q 11/0046 408/241 S |
| 7,354,226 B2 | * | 4/2008 | Britz .................. | B23Q 11/0046 144/252.1 |
| 9,114,491 B2 | | 8/2015 | Kakiuchi et al. | |

(Continued)

FOREIGN PATENT DOCUMENTS

| | | |
|---|---|---|
| DE | 102017101027 A1 | 7/2017 |
| EP | 1 245 330 | 10/2002 |

(Continued)

OTHER PUBLICATIONS

Extended European Search Report dated Jan. 2, 2017 issued in corresponding EP application.

*Primary Examiner* — Andrew M Tecco
*Assistant Examiner* — Eyamindae C Jallow
(74) *Attorney, Agent, or Firm* — Amir Rohani (57) ABSTRACT

A dust extractor for a drill includes a housing having an engagement region for receiving the drill when connected to the dust extractor; and a latch mechanism. The latch mechanism includes a latch moveably mounted within the housing and moveable between a first position and a second position, a biasing mechanism biasing the latch towards the first position, and a catch attached to the latch. The catch has a chamfer which is arranged so that the chamfer slidingly engages the drill and moves the latch from its first position towards its second position when the drill enters the engagement region.

20 Claims, 7 Drawing Sheets

(56) References Cited

U.S. PATENT DOCUMENTS

| | | | |
|---|---|---|---|
| 2002/0096341 A1* | 7/2002 | Hagan | B25B 21/00 173/170 |
| 2004/0211576 A1* | 10/2004 | Milbourne | B23B 45/008 173/48 |
| 2004/0251041 A1* | 12/2004 | Grossman | B23Q 1/0009 173/217 |
| 2008/0202781 A1* | 8/2008 | Nishikawa | B23Q 11/0046 173/104 |
| 2011/0226499 A1* | 9/2011 | Kakiuchi | B23Q 11/0046 173/75 |
| 2012/0234570 A1* | 9/2012 | Machida | B23Q 11/0046 173/197 |
| 2012/0298391 A1* | 11/2012 | Kakiuchi | B23Q 11/0046 173/77 |
| 2012/0318553 A1* | 12/2012 | Chen | B23Q 11/0046 173/198 |
| 2013/0031879 A1* | 2/2013 | Yoshikane | B23Q 11/0046 55/356 |
| 2013/0055523 A1* | 3/2013 | Yoshikane | B28D 7/02 15/347 |
| 2014/0124230 A1* | 5/2014 | Johnson | B25F 5/006 173/162.1 |
| 2016/0128531 A1 | 5/2016 | Conrad | |

FOREIGN PATENT DOCUMENTS

| | | |
|---|---|---|
| EP | 1 459 841 | 9/2004 |
| EP | 1459842 B1 | 8/2006 |
| EP | 1714732 B1 | 7/2008 |
| EP | 1477272 B1 | 10/2009 |

\* cited by examiner

DUST EXTRACTOR

FIELD

The present invention relates to a dust extractor for a drill and in particular, for a hammer drill.

BACKGROUND

A hammer drill typically includes an electric motor, a hammer mechanism and/or a rotary drive. The hammer drill is powered either by an AC mains electric power supply or a battery attached to the hammer drill. A cutting tool, such as a drill bit, is supported within a tool holder mounted on the front of the hammer drill which is driven by the motor via either the rotary drive or the hammer mechanism or both to perform cutting operations. Such a hammer drill usually can operate in a hammer only mode, a drill only mode or a hammer and drill mode. EP 1 157 788 describes a typical example of such hammer drill.

During the operation of a hammer drill a large amount of dust can be generated. As such it is desirable to collect the dust for disposal. One way of achieving this is by the use of a dust extractor. EP 1 245 330 discloses an example of a dust extractor.

Dust extractors may be attached to the body of a hammer drill. The dust extractor comprises a main body and a shroud, typically mounted on the end of tubular telescoping, arm which is attached to the main body, and which surrounds the cutting tool and engages with the work piece being cut. The dust extractor comprises a dust collection box, a filter mounted within the dust collection box and an air suction device. While the hammer drill is in use, the air suction device is switched on. During use, the dust generated by the cutting tool cutting the work piece enters the shroud. The air suction device draws the air together with dust from within the shroud, through the telescoping arm into the dust collection box. The air passes then through the filter, while the dust is trapped by the filter within the dust collection box. The an air is then typically expelled from the dust extractor. Once the operation of the hammer is complete, the dust extraction box can be removed from the dust extractor and the dust removed from the dust collection box for disposal.

Some dust extractors have the air suction device located remotely from the body. For example, the cooling fan of the electric motor of the hammer drill can be used as the air suction device and generate an air vacuum source which connects to the main body of the dust extractor. The air is drawn through the filter, out of the main body of the dust extractor and then into the housing of the hammer drill where it passes through the cooling fan of the hammer drill.

In alternative designs, a fan is rotatably mounted within the main body of the dust extractor adjacent the filter. The fan is rotatably driven by a motor to generate an air vacuum source and draw air from the shroud into the dust collection box and then through the filter before expelling it from the main housing. The fan can be rotatably driven by an electric motor mounted within the main housing of the dust extractor. EP 1 459 842 discloses such a dust extractor. Alternatively, the fan can be releasably attached to the spindle of the drive motor of the hammer drill. DE4024022 discloses such a dust extractor.

SUMMARY

A dust extractor for a drill has a housing having an engagement region for receiving at least part of the housing of a drill when connected to the dust extractor, and a latch mechanism. The latch mechanism has a latch moveably mounted within the housing and is capable of moving between a first position and a second position, a biasing mechanism biasing the latch towards its first position; and a catch attached to the latch. When the latch is in the first position, the catch projects into the engagement region. When the latch is in its second position, the catch is located outside of the engagement region. The catch has at least one chamfer which is arranged so that, when the latch is in its first position and a part of a drill enters the engagement region, the chamfer sliding engages the part of the drill and moves the latch from its first position towards its second position.

The use of the chamfers on the catches allows the automatic movement of the latch to move the catches out the way of the drill when the drill is brought into engagement with the dust extractor. This allows the operator to simply push the dust extractor onto the drill with no additional actions by the operator being required to engage the dust extractor with the drill.

BRIEF DESCRIPTION OF THE DRAWINGS

An embodiment of the present invention will now be described with reference to the accompanying drawings of which.

DETAILED DESCRIPTION

Figure 1:
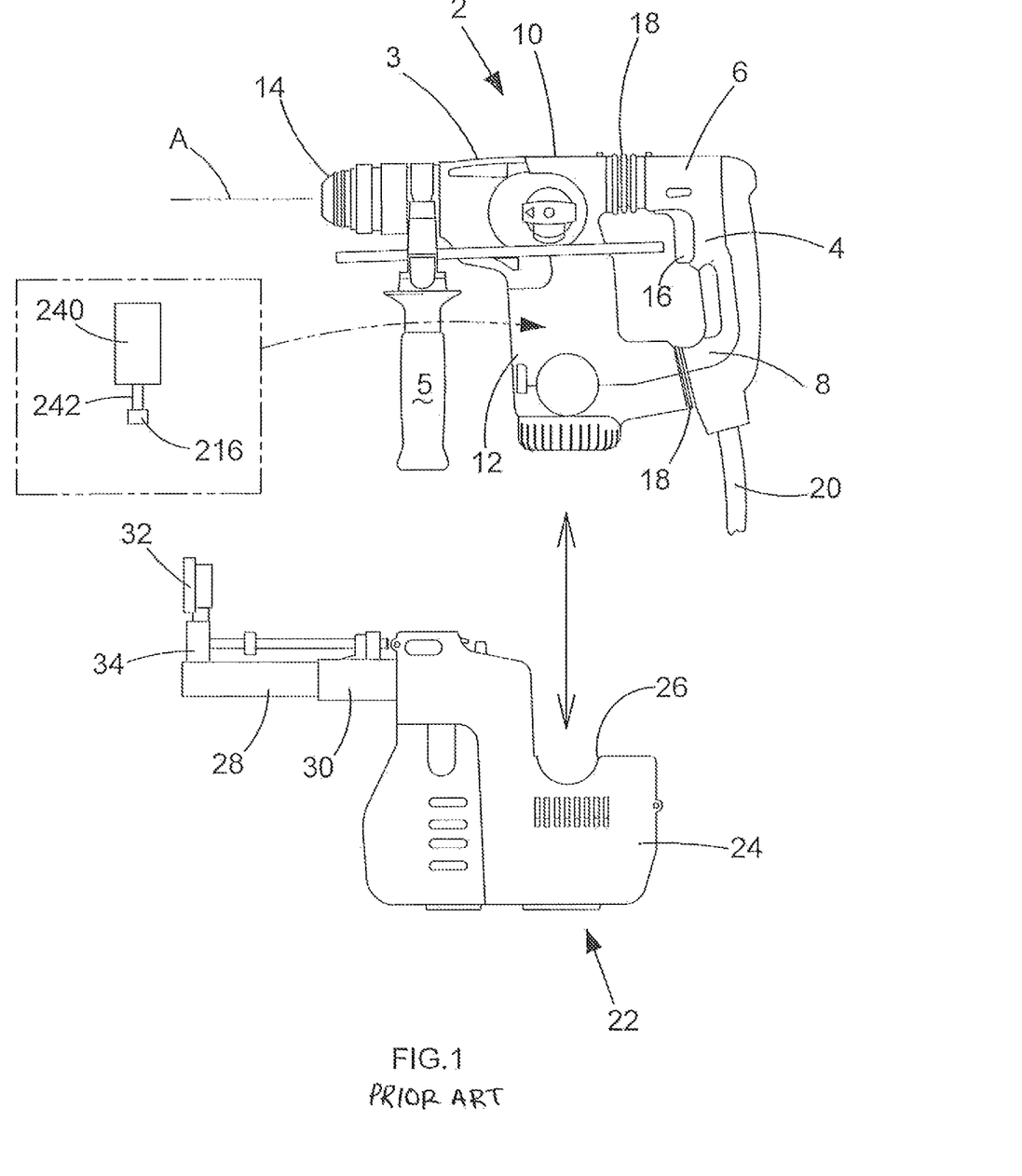
FIG. 1 shows a right side view of a prior art hammer drill and dust extractor.

Referring to FIG. 1, a prior art hammer drill has a main housing 2 and a rear handle 4 attached to the main housing 2 via vibration dampeners 18 at its upper 6 and lower 8 ends. The main housing 2 has a motor housing 12, in which is mounted an electric motor 240 having an output spindle 242 and a transmission housing 10, in which is mounted the hammer mechanism (not shown) and rotary drive (not shown). A mode change knob 3 is used to change the mode of operation of the hammer drill. A tool holder 14 is mounted on the front of the transmission housing 10 which can releasably hold a cutting tool (not shown). The tool holder 14 is capable of being rotated about axis A. A front handle 5 is attached to the transmission housing 10 behind the tool holder 14. A trigger switch 16 is mounted within the rear handle 4 by which an operator can activate the hammer drill. An electric cable 20 connects to the base of the rear handle 4 by which a mains AC electric power supply is supplied to the hammer drill.

A typical dust extractor comprises a main housing 22 manufactured from two plastic clam shells 24, 26 which are joined together about a vertical plane using screws. Mounted on the top of the main housing is a telescoping tubular extension arm 28, 30. A first section 28 of the telescoping arm 30 can slide in and out of the other second section 30. A spring (not shown) biases the first section 28 out of the second section 30 towards its maximum extended position.

Mounted on the end of the first section 28 remote from the main housing is a tubular support 34 end a shroud 32. A hole is formed through the shroud 32 to allow the cuffing tool to pass through the shroud 32.

A dust collection box 26 releaseably connects to the front of the main housing 22. A filter (not shown) is mounted within the box 26.

Figure 2:
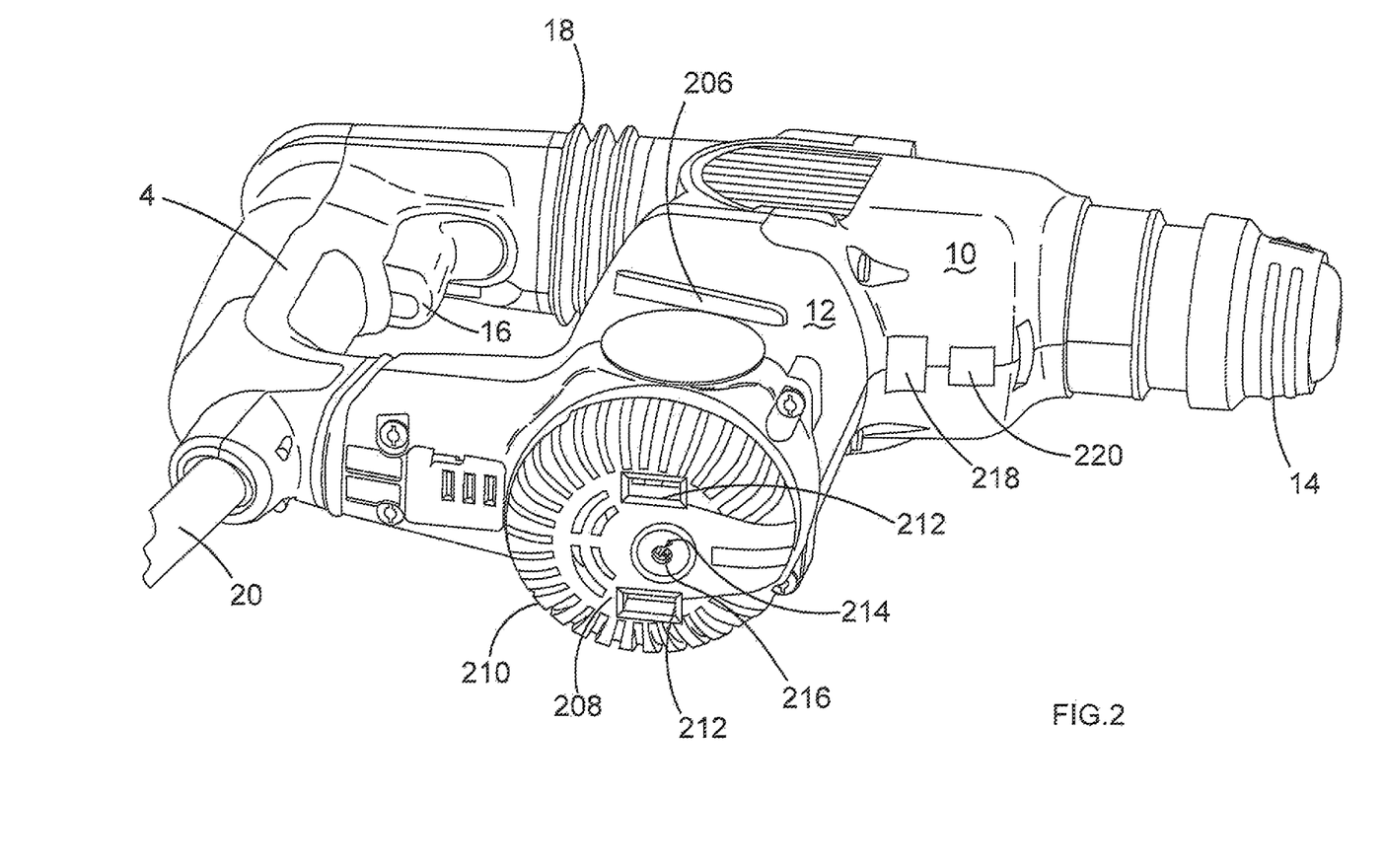
FIG. 2 shows a lower perspective view of a hammer drill to be used with a dust extractor in accordance to the present invention.
Figure 3:
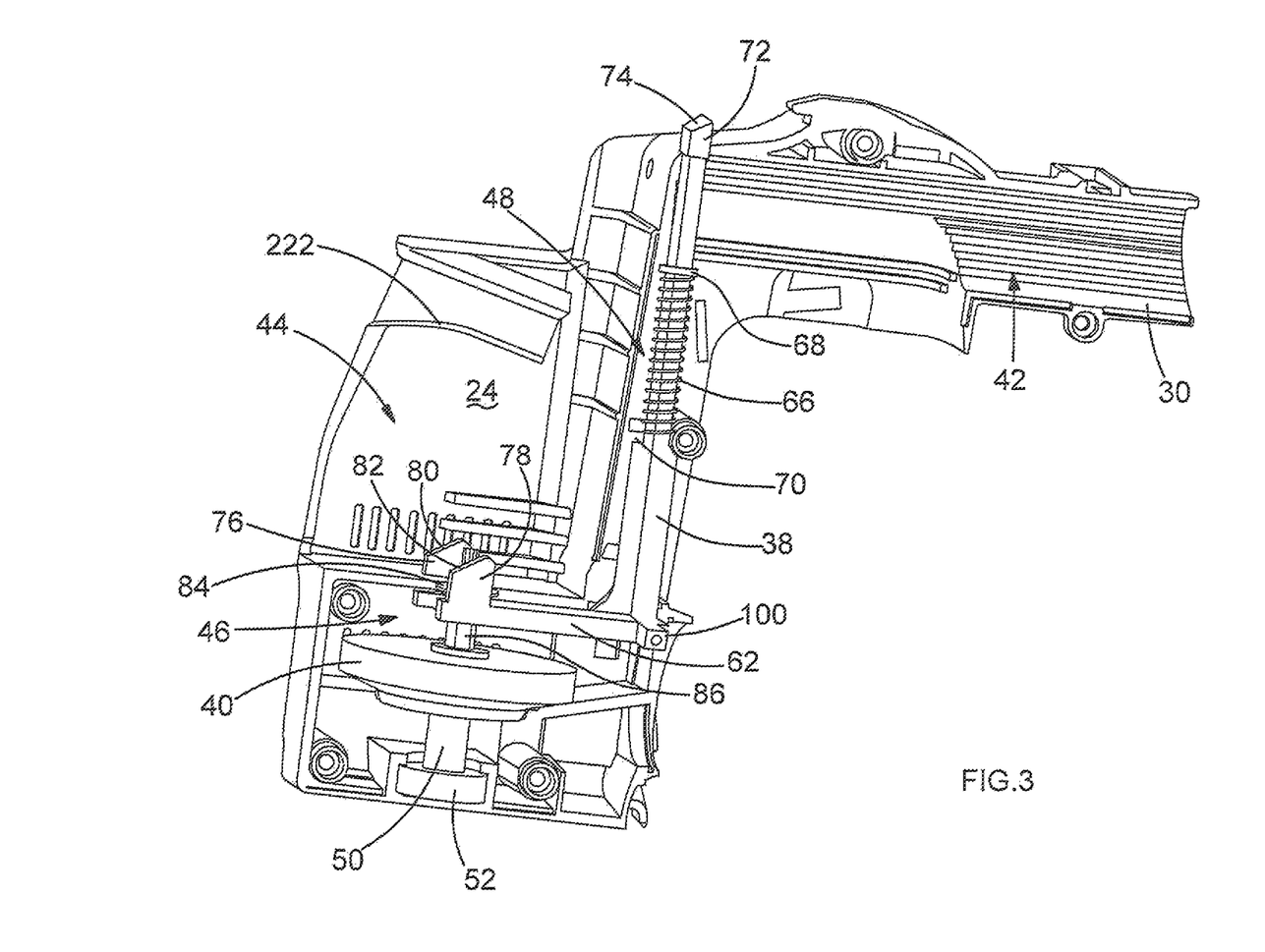
FIG. 3 shows a left side view of one of the clam shells of the main housing of the dust extractor.
Figure 4:
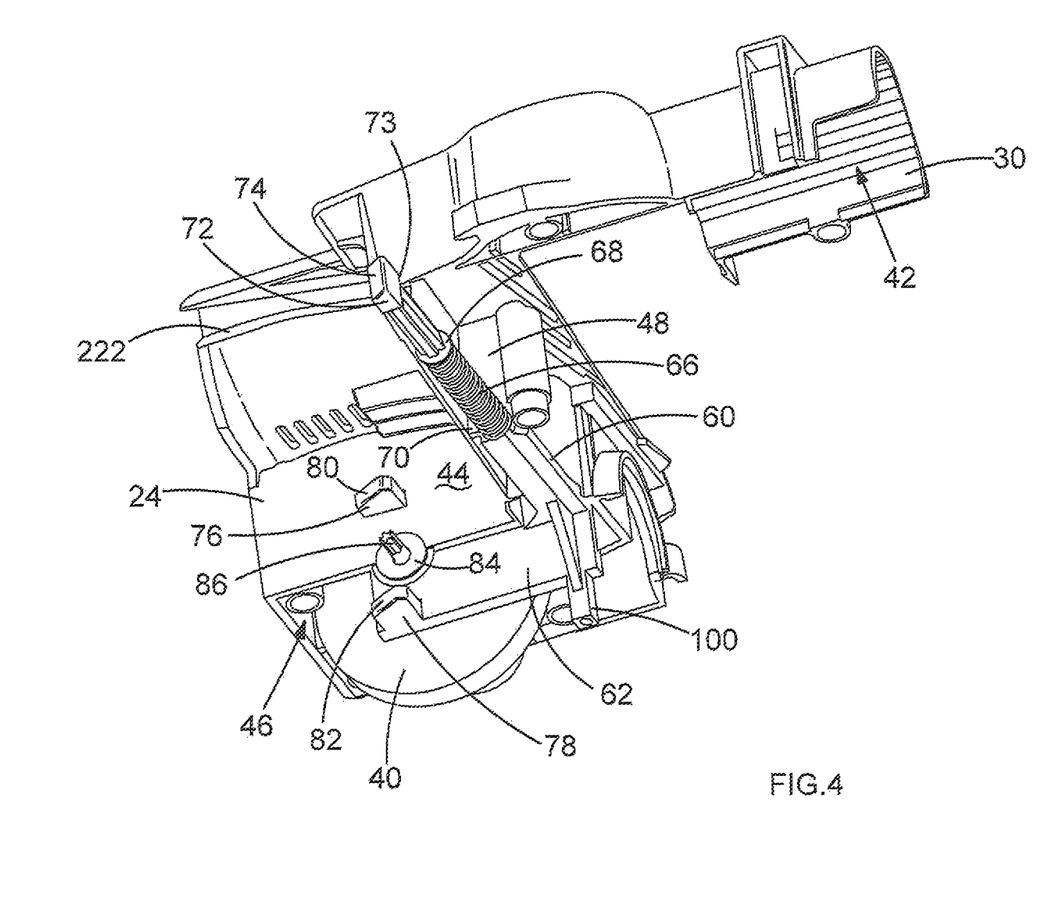
FIG. 4 shows a perspective view of the clam shell of FIG. 3.

An embodiment of the present invention will now be described with reference to FIGS. 2 to 7, where like numerals refer to like parts. Referring to FIG. 3 which shows the clam shell 24 of the main housing 22 of the dust extractor with a latch mechanism 38 and fan wheel 40. The main housing 22 is preferably formed in four sections 42, 44, 46, 48. The first section 42 preferably forms the second section 30 of the telescopic arm. The second section 44 preferably forms a recess into which a part of the motor housing 12 of the hammer drill can slide in order for it to be attached to the dust extractor. The third section 46 preferably forms a fan housing for the fan wheel 40. The fourth section 48 preferably provides a chamber in which the latch mechanism 38 is slideably mounted within the main housing 22.

The fan wheel 40 may be rigidly mounted on a tubular spindle 50 which may be rotatably mounted in bearing 52. Bearing 52 is preferably attached to the base well of the third section 46. The fan 40 preferably acts as a radial fan when rotationally driven.

Figure 5:
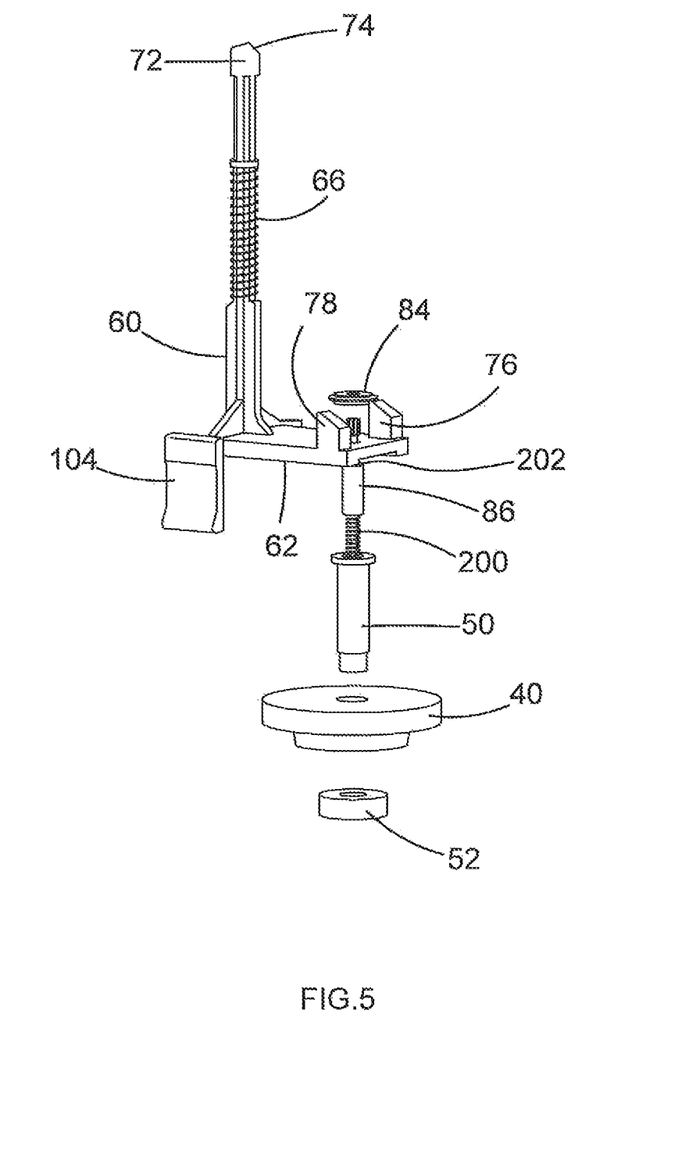
FIG. 5 shows an exploded view of a latch mechanism.

The latch mechanism 38 may comprise a horizontal plate 62 connected to a vertical elongate rod 60. The elongate rod 60 may be slideably mounted within the fourth section 48 of the main housing 22 and can slide over a limited range of movement along its longitudinal axis 64. A helical spring 66 may surround the elongate rod 60 and is preferably sandwiched between a shoulder 68 formed on the elongate rod 60 and the side of an internal wall 70 formed within the fourth section 48. The spring 66 biases the elongate rod 60 to its upper most position.

A first catch 72, with a chamfered edge 74, is preferably formed on the top end of the rod 60. When the elongate rod 60 is in its uppermost position, the catch 72 passes through an aperture 73 formed in the outer top wall of the main housing 22 of the dust extractor and extends upwardly away from the main housing 22. When the elongate rod 60 is moved to its lowermost position, the catch 72 is withdrawn from aperture 73 into the main housing 22 so that none of the first catch 72 is external of the main housing 22.

Second and third catches 76, 78 are mounted in parallel on the sides of the plate 62 remote from the elongate rod 60. The second and third catches 76, 78 each has corresponding chamfers 80, 82 and preferably have the same dimensions as each other. The second and third catches 76, 78 preferably extend in the same direction and in parallel to the first catch 72. When the elongate rod 60 is in its uppermost position, the plate 60 preferably moves to its upper most position with the catches 76, 78 passing through apertures 75 formed in the upper wall of the third section 46 and extends into the recess formed by the second section 44. When the elongate rod 60 is moved to its lowermost position, the plate 62 also moves to its lowest position, withdrawing the catches 76, 78 from apertures 75 and moving them inside of the third section 46 with neither of the second or third catches 76, 78 extending into the second section 44.

Two arms 100, preferably extend horizontally from the sides of the plate 62 in a symmetrical fashion and in opposite directions, adjacent the elongate rod 60. Each arm 100, 102 may extend through apertures 106 formed within the side walls of the main housing 22. A button 104 is preferably attached to the end of each arm 100, 102. Button 104 may be external to the main housing 22 and accessible by an operator so that the operator can engage with the buttons 104 and move the buttons 104 up and down, which in turn, moves the latch mechanism 38 up and down.

A bearing 84 is preferably mounted in the plate 62 between the second and third catches 76, 78.

A drive spindle 86 may be mounted in a slideable manner within the top end of the tubular spindle 50 for the fan wheel 40. Preferably drive spindle 86 has a torx or 6-point star-shaped connection at its top end. The drive spindle 86 can axially slide within the tubular spindle 50 but is rotationally fixed to the tubular spindle 50 such that rotation of the tubular spindle 50 results in rotation drive spindle 86. A helical spring 200 is preferably located inside of the tubular spindle 50 and may be sandwiched between an inner base wall of the tubular spindle 50 and a lower end of the drive spindle 86. The spring 200 preferably urges the drive spindle upwardly, away from the tubular spindle 50. The drive spindle 86 extends from the tubular spindle 50 and passes through the bearing 84 in the plate 62. The bearing 84 preferably limits the upward movement of the drive spindle 86 due to a shoulder 202 formed on the drive spindle 86 engaging with the underside of the bearing 84. When the plate 62 and bearing 84 moves up and down, as the elongate rod 60 slides up and down, the drive spindle 86 also moves up and down due to the biasing force of the spring 200 urging the drive spindle 86 upwardly towards the position of the bearing 84, which limits the drive spindle's 86 upward movement.

Therefore, as the plate 60 moves up and down, the bearing 84 and drive spindle 86 both move up and down with the plate 60. When the plate 60 is in its uppermost position, the upper end of the drive spindle 86 is able to extend into the recess formed by the second section 44. When the plate 62 also moves to its lowest position, it moves the bearing 84 and hence the drive spindle 86 downwardly, withdrawing the drive spindle 86 from the second section 44 and into the third section 46 with none of the drive spindle 86 extending into the second section 44.

A rib 206 may be formed on each side of the motor housing 12. The underside wall 208 of the motor housing 12 is preferably flat with the edges 210 being preferably curved to meet the side wall of the motor housing 12. Two recesses 212 are preferably formed symmetrically on the underside wall 208 of the motor housing 12. An aperture 214, located between the two recesses 212, may be formed through the center of the underside wall 208. Located inside of the motor housing 12 adjacent the aperture is a socket 216 which may be rigidly mounted on the end of the output spindle 242 of the electric motor 240 of the hammer drill. The socket 216 preferably has a torx or 6-point star-shaped profile. The entrance to the socket 216 preferably faces the aperture 214 so that the insertion of the drive spindle 86 into and through the aperture 214 would engage with the socket 216.

A third recess 218 is preferably formed on the underside of the transmission housing 10. Forward of the third recess 218 is an inclined surface 220.

Figure 6:
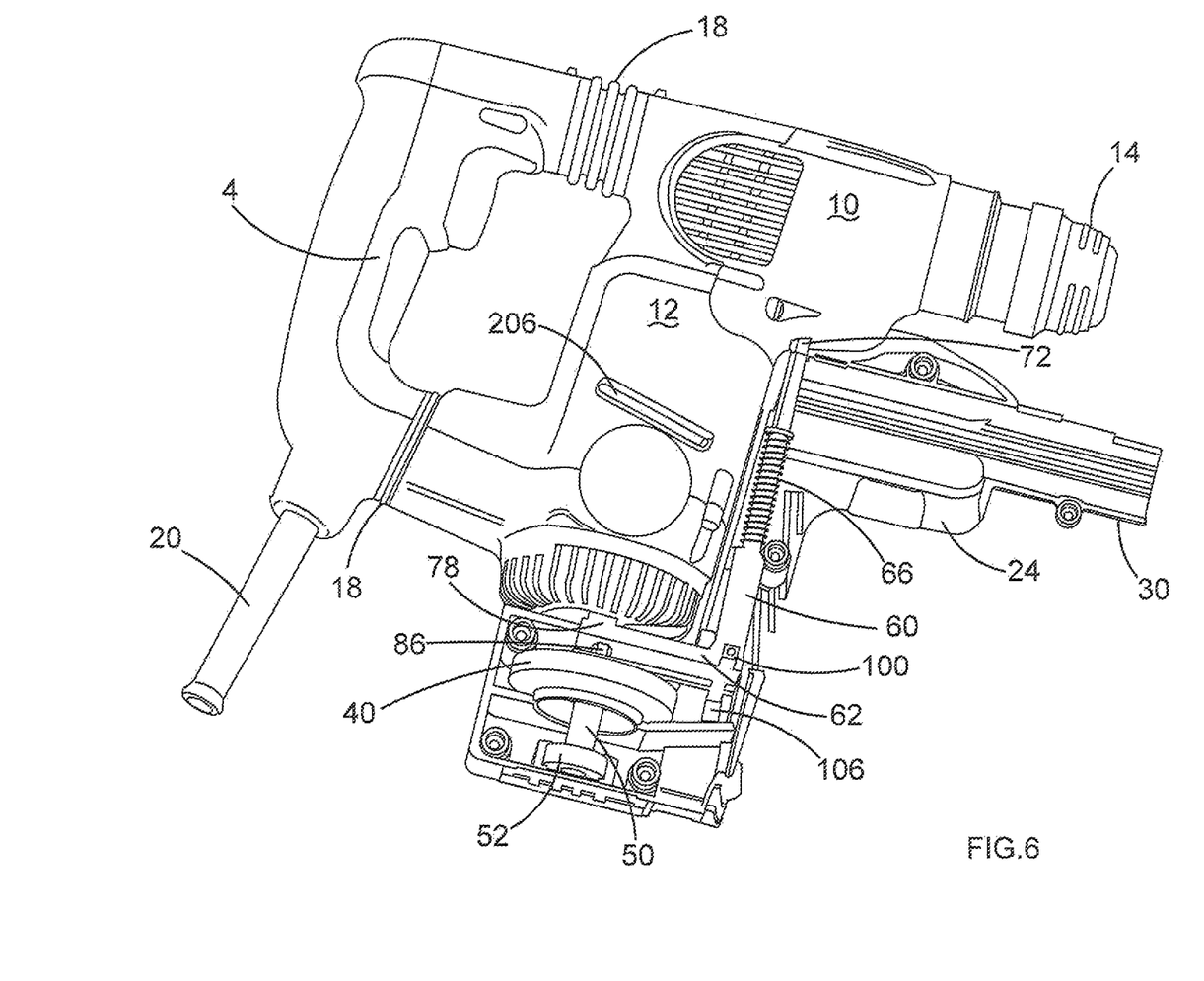
FIG. 6 shows a left side view of the clam shell of FIG. 3 attached to the hammer drill of FIG. 2.

In order to mount the dust extractor onto the hammer drill, the front of the motor housing 12 is slid into the recess formed by the second section 44 of the main housing 22 of the dust extractor. As motor housing 12 enters the recess, the two ribs 206 engage with two walls 222 formed inside of the recess. The ribs 206 slide along the walls 222 and act to guide the motor housing 12 inside of the recess. The sliding movement of the hammer drill into the recess is preferably in a direction parallel to the axis of rotation A of the tool holder 14.

As the motor housing 12 enters the recess, the chamfered edge 74 of the first catch 72 engages with the inclined surface 220 on the underside of the transmission housing 10. The chamfered edges 80, 82 of the second and third catches 76, 78 engage with the rounded edges 210 of the underside wall 208 of the motor housing 12. As the motor housing 12 continues to enter the recess, the sliding movement of chamfered edges 74, 80, 82 over the inclined surface 220 and rounded edges 210 causes the three catches 72, 76, 78, and hence the whole latch mechanism 38, to be pushed downwardly inside of the main housing 22 of the dust extractor. As the latch mechanism 38 is pushed downwardly, the latch mechanism 38 moves downwardly against the biasing force of the spring 66. In addition, the movement of the latch mechanism 38 also results in the drive spindle 86 being moved downwardly, out of the recess and into the tubular spindle 50 against the biasing force of the spring 200 in the tubular spindle 50. As such, the latch mechanism 38 and drive spindle 86 are moved out of the way motor and transmission housings 10, 12 of the hammer drill and therefore the motor housing 12 can freely enter the recess.

When the motor housing 12 is fully inserted into the recess formed by the second section 44, the first catch 72 preferably aligns with the recess 218 underneath the transmission housing 10. The second and third catches 76, 78 also preferably align with the two recesses 212 formed in the underside wall 208 of the motor housing 12. Therefore, the catches 72, 76, 78 can able to move into the recesses 212, 218. The spring 66 urges the latch mechanism 38 upwardly, causing the catches 72, 76, 78 to engage with the recesses 212, 218. When the catches 72, 76, 78 are engaged in the recesses 212, 218 and held there by the spring 66, the dust extractor is locked onto the hammer drill.

When the latch mechanism 38 moves upwardly, the drive spindle 86 also moves upwardly towards the underside wall 208 of the motor housing 12. When the motor housing 12 is fully inserted into the recess formed by the second section 44, the aperture 214 formed through the underside wall 208 is aligned with the drive spindle 86. As such, the drive spindle 86 preferably enters the aperture 214 and passes through the aperture 214 to engage with the socket 216. When the drive spindle 86 is engagement with the socket 216, rotation of the motor spindle results in rotation of the drive spindle 86, which in turn rotatingly drive tubular spindle 50 and hence the fan wheel 40. This creates a suction force to operate the dust extractor. In the event that the torx profile of the drive spindle 86 is not aligned with the torx profile of the socket 216, the drive spindle 86 will engage the end of the socket 216 and be prevented from further upward movement. However, the latch mechanism 38 is able to continue to rise to fully engage the catches 72, 76, 78 in the recesses 212, 218, the relative movement between the drive spindle 86 and latch mechanism 38 being accommodated by the compression of the spring 200 within tubular spindle 50. When the motor of the hammer drill is activated, the torx profile of the drive spindle 86 and that of the socket 216 will become aligned. Once aligned, the spring 200 in the tubular spindle 50 will push the drive spindle 86 upwardly, causing the end of the drive spindle 86 to engage with socket 216 so that the drive spindle 86 becomes drivingly engaged with the spindle of the motor.

Figure 7:
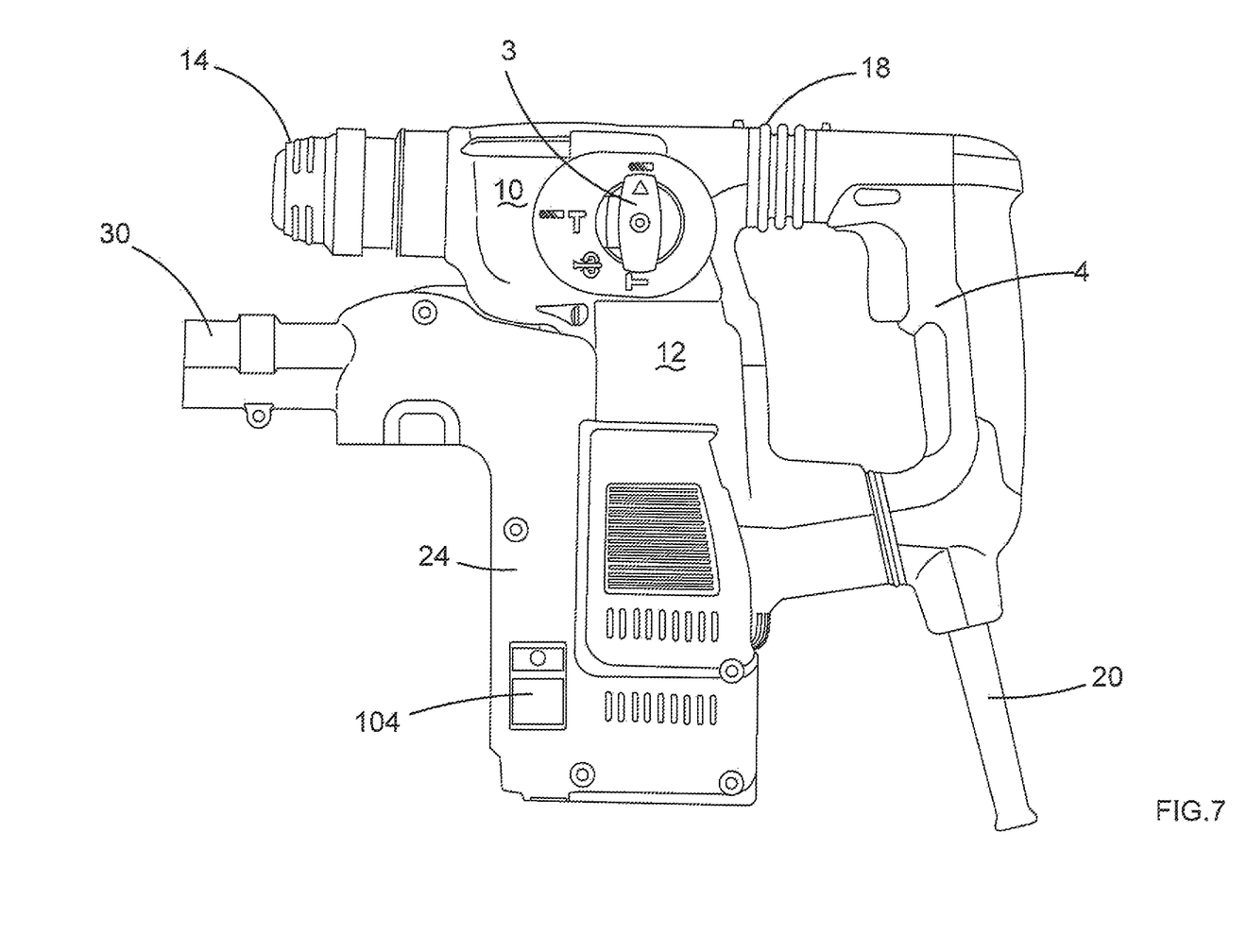
FIG. 7 shows a right side view of the hammer drill of FIG. 2 with the dust extractor in accordance to the present invention.

Once the dust extractor is attached to the hammer drill and the drive spindle 86 is drivingly engaged with the motor spindle, the operation of the hammer drill will result in the automatic operation of the dust extractor. The space occupied by the hammer drill when it is attached to the dust extractor is referred to as the engagement region. In the present embodiment it includes, but is not limited to the space formed by the recess formed by the second section 44 of the dust extractor and the area above the top wall of the main hosing where the first catch 72 is capable of extending.

The use of the chamfers 74, 80, 82 on the catches 72, 76, 78 allows the automatic movement of the latch 38 to move the catches 72, 76, 78 out the way of the hammer drill when the hammer drill is brought into engagement with the dust extractor. This allows the operator to simply push the dust extractor onto the hammer drill with no additional actions by the operator being required to engage the dust extractor with the hammer drill.

In order to release the dust extractor from the hammer drill, the operator slides the two buttons 104 downwardly on the main housing 22 the of the dust extractor. This moves the latch mechanism 38 downwardly against the biasing force of the spring 66. This results in the catches 72, 76, 78 disengaging from the recesses. As the latch mechanism 38 moves downwardly, it also results in the drive spindle 86 moving downwardly against the biasing force of the spring 200 in the tubular spindle 50. As such the drive spindle 86 disengages with the socket 216 and is withdrawn from the aperture 214 in the underside wall 208 of the motor housing 12. As such, the motor housing can be freely slid out of the recess formed by the second section 44 of the dust extractor, separating the two from each other.

Whilst the embodiment of present invention has been described in relation to a hammer drill, it will be appreciated that the scope of the invention could include any types of drill.

The invention claimed is:

1. A dust extractor for a drill comprising:
    a housing having an engagement region for receiving at least an engaging part of the drill when connected to the dust extractor; and
    a latch mechanism comprising:
        a latch having a longitudinal axis moveably mounted within the housing and moveable between a first position and a second position along the longitudinal axis;
        a biasing mechanism biasing the latch towards the first position; and
        at least one catch disposed at a longitudinal end of the latch, wherein the at least one catch comprises a chamfer which is arranged so that, when the latch is in the first position and the engaging part of the drill enters the engagement region of the housing, the chamfer slidingly engages the engaging part of the drill and moves the latch substantially along the longitudinal axis from the first position towards the second position, wherein the latch is located inside of the housing when the latch is in the second position.

2. A dust extractor according to claim 1 wherein the engagement region comprises a recess formed within a section formed within the housing.

3. A dust extractor according to claim 1 further comprising:
    a fan wheel rotatable mounted within the housing;
    a drive spindle rotationally connected to the fan wheel;
    wherein the drive spindle is axially slideable between two positions, a first position where an end of the drive spindle extends into the engagement region and a second position where the end of the drive spindle is located outside of the engagement region;

wherein the drive spindle is connected to the latch such that, when the drive spindle and the latch are in their corresponding first positions, movement of the latch from the first position to the second position results in movement of the drive spindle from the first drive spindle position to the second drive spindle position.

4. A dust extractor according to claim 3 wherein the drive spindle is biased towards the latch.

5. A dust extractor according to claim 3, wherein the drill comprises:
- an outer housing;
- a motor;
- at least one recess formed in the outer housing configured to receive the at least one catch when the latch is in the first position;
- an aperture formed through the outer housing configured to receive the drive spindle when the latch is in the first position; and
- a socket drivingly connected to the motor for drivingly engaging the drive spindle when the latch is in the first position.

6. A dust extractor according to claim 5 wherein the drill further comprises at least one surface engageable with the chamfer of the at least one catch when the engaging part of the drill is moved into the engagement region.

7. A dust extractor according to claim 1, wherein the engaging part of the drill comprises a recess arranged to receive the at least one catch, and wherein, the latch (i) is in the first position when the chamfer comes into contact with the engaging part of the drill, (ii) moves substantially along the longitudinal axis from the first position to the second position against a biasing force of the biasing mechanism as the chamfer slidingly engages the engaging part of the drill until, and (iii) is forced by the biasing mechanism to move from the second position to the first position when the chamfer aligns within the recess of the drill to allow the catch to engage the recess of the drill.

8. A dust extractor according to claim 1, wherein the drill comprises:
- a motor housing supporting a motor defining a motor axis;
- a transmission housing to which a tool holder is mounted defining a transmission axis;
- two ribs formed on sides of the motor housing.

9. A dust extractor according to claim 8, further comprising two walls formed inside the engagement region of the housing, wherein the two ribs of the drill engage the two walls of the dust extractor when the engaging part of the drill enters the engagement region of the housing, and the two ribs of the drill slide along the two walls of the dust extractor to guide the motor housing inside the housing in a direction substantially parallel to the transmission axis.

10. A dust extractor according to claim 8, wherein the longitudinal axis of the latch is substantially parallel to the motor axis.

11. A dust extractor for a drill comprising:
a housing having an engagement region for receiving at least an engaging part of the drill when connected to the dust extractor;
a fan wheel rotatable mounted within the housing;
a drive spindle rotationally connected to the fan wheel, wherein the drive spindle is axially slideable between two positions, a first position where an end of the drive spindle extends into the engagement region and a second position where the end of the drive spindle is located outside of the engagement region; and a latch mechanism comprising:
- a latch having a longitudinal axis moveably mounted within the housing and moveable between a first position and a second position along the longitudinal axis;
- a biasing mechanism biasing the latch towards the first position; and
- at least one catch disposed at a longitudinal end of the latch,
wherein the at least one catch comprises a chamfer which is arranged so that, when the latch is in the first position and the engaging part of the drill enters the engagement region of the housing, the chamfer slidingly engages the engaging part of the drill and moves the latch substantially along the longitudinal axis from the first position towards the second position, and wherein the drive spindle is connected to the latch such that, when the drive spindle and the latch are in their corresponding first positions, movement of the latch from the first position to the second position results in movement of the drive spindle from the first drive spindle position to the second drive spindle position.

12. A dust extractor according to claim 11 wherein the drive spindle is biased towards the latch.

13. A dust extractor according to claim 11, wherein the drill comprises:
- an outer housing;
- a motor;
- at least one recess formed in the outer housing configured to receive the at least one catch when the latch is in the first position;
- an aperture formed through the outer housing configured to receive the drive spindle when the latch is in the first position; and
- a socket drivingly connected to the motor for drivingly engaging the drive spindle when the latch is in the first position.

14. A dust extractor according to claim 13 wherein the drill further comprises at least one surface engageable with the chamfer of the at least one catch when the engaging part of the drill is moved into the engagement region.

15. A dust extractor according to claim 11, wherein the engaging part of the drill comprises a recess arranged to receive the at least one catch, and wherein, the latch (i) is in the first position when the chamfer comes into contact with the engaging part of the drill, (ii) moves substantially along the longitudinal axis from the first position to the second position against a biasing force of the biasing mechanism as the chamfer slidingly engages the engaging part of the drill until, and (iii) is forced by the biasing mechanism to move from the second position to the first position when the chamfer aligns within the recess of the drill to allow the catch to engage the recess of the drill.

16. A dust extractor according to claim 11 wherein the engagement region comprises a recess formed within a section formed within the housing.

17. A dust extractor for a drill comprising:
a housing having an engagement region for receiving at least an engaging part of the drill when connected to the dust extractor;
two walls formed inside the engagement region of the housing; and a latch mechanism comprising:

a latch having a longitudinal axis moveably mounted within the housing and moveable between a first position and a second position along the longitudinal axis;

a biasing mechanism biasing the latch towards the first position; and at least one catch disposed at a longitudinal end of the latch, wherein the at least one catch comprises a chamfer which is arranged so that, when the latch is in the first position and the engaging part of the drill enters the engagement region of the housing, the chamfer slidingly engages the engaging part of the drill and moves the latch substantially along the longitudinal axis from the first position towards the second position, wherein the drill comprises: a motor housing supporting a motor defining a motor axis; a transmission housing to which a tool holder is mounted defining a transmission axis; and two ribs formed on sides of the motor housing; and wherein the two ribs of the drill engage the two walls of the dust extractor when the engaging part of the drill enters the engagement region of the housing, and the two ribs of the drill slide along the two walls of the dust extractor to guide the motor housing inside the housing in a direction substantially parallel to the transmission axis.

18. A dust extractor according to claim 17 wherein the engagement region comprises a recess formed within a section formed within the housing.

19. A dust extractor according to claim 17 wherein the latch is located inside of the housing when the latch is in the second position.

20. A dust extractor according to claim 17, wherein the longitudinal axis of the latch is substantially parallel to the motor axis.

* * * * *